United States Patent
Couse

(10) Patent No.: US 12,449,881 B2
(45) Date of Patent: Oct. 21, 2025

(54) METHOD OF AND SYSTEM FOR MANAGING POWER CONSUMPTION OF A DEVICE

(71) Applicant: Mitel Networks Corporation, Kanata (CA)

(72) Inventor: Peter Couse, Ottawa (CA)

(73) Assignee: MITEL NETWORKS CORPORATION, Kanata (CA)

( * ) Notice: Subject to any disclaimer, the term of this patent is extended or adjusted under 35 U.S.C. 154(b) by 59 days.

(21) Appl. No.: 18/444,346

(22) Filed: Feb. 16, 2024

(65) Prior Publication Data
US 2025/0264926 A1  Aug. 21, 2025

(51) Int. Cl.
*G06F 1/3206* (2019.01)
*G06F 1/3296* (2019.01)

(52) U.S. Cl.
CPC .......... *G06F 1/3206* (2013.01); *G06F 1/3296* (2013.01)

(58) Field of Classification Search
None
See application file for complete search history.

(56) References Cited

U.S. PATENT DOCUMENTS

| | | | | |
|---|---|---|---|---|
| 2007/0160027 | A1* | 7/2007 | Muqattash | H04W 52/0216 370/347 |
| 2009/0036164 | A1* | 2/2009 | Rowley | H04W 12/069 726/9 |
| 2014/0025849 | A1* | 1/2014 | Deborgies | G06F 21/35 710/38 |
| 2017/0242473 | A1* | 8/2017 | Bostick | G06F 9/4418 |
| 2018/0348844 | A1* | 12/2018 | Lingutla | G06F 1/3209 |

FOREIGN PATENT DOCUMENTS

| | | |
|---|---|---|
| CN | 114980363 A | 8/2022 |
| WO | 2007076139 A2 | 7/2007 |

OTHER PUBLICATIONS

System and method of finding a lost/stolen mobile device which is not accessible by the owner (Year: 2012).*
Sleep and Wake Command for Voice Activated Devices (Year: 2018).*
Muthurani Lavanya Paneerselvam, "Power Save on Cisco IP Phones", Mar. 12, 2019, community.cisco.com.

* cited by examiner

*Primary Examiner* — Kim Huynh

(57) ABSTRACT

Methods and systems for managing power consumption of a device are provided. Exemplary methods and systems include monitoring a proximity connection between a device and a mobile device and, upon detecting by the device one or more of the mobile device is beyond the predetermined distance or the proximity connection disconnected, automatically transitioning the device from a wake mode to a sleep mode and providing a user interphase prompt on one or more of the device and the mobile device to query a user whether to allow the device to enter the sleep mode.

18 Claims, 2 Drawing Sheets

METHOD OF AND SYSTEM FOR MANAGING POWER CONSUMPTION OF A DEVICE

FIELD OF THE DISCLOSURE

The present disclosure generally relates to electronic communication systems, devices, and methods. More particularly, the disclosure relates to communication devices, systems, and methods to manage power use of devices.

BACKGROUND OF THE DISCLOSURE

Due to generally increasing electricity costs and government and industry Environmental, Social & Governance (ESG) directives that require organizations to provide strategies to reduce their environmental impact from a carbon footprint perspective, organizations are motivated to reduce power consumption. When considering an organization's unified communication (UC) systems, internet protocol (IP) phones are large consumers of power. Suppliers of UC systems may therefore look for ways to reduce the power consumption of networked IP Phones.

Generally, an IP phone is desirably fully power and ready to be used to answer or place calls while the user is sitting at his or her desk. So, while the user is present, the phone cannot transition to a low power "sleep" state to conserve the maximum amount of power.

In some systems, a user may manually log out of a UC system. Once the user manually logs out of the UC system, the IP phone may be put into sleep mode. While this may work for some applications, the UC system typically has no way of knowing whether the user is present at their desk or not and therefore techniques that would allow the phone to draw a reduced amount of power cannot be enabled, because these techniques would render the phone unusable for certain desired functions, such as, for example, displaying/alerting incoming calls, displaying line appearances that a user may desire to monitor the status of, and/or the like. Furthermore, the manual logout process can be cumbersome and time consuming.

Other techniques may employ display screen savers that dim a display backlight of an IP phone after a predetermined time of inactivity on the phone or based on a time of day scheduled standby mode. Other techniques include a system-wide solution and do not provide an intelligent way to manage power of a device according to whether user is present at a desk or workspace—or not. Accordingly, improved devices and systems and methods of using the devices and systems are desired.

Any discussion of problems and solutions involved in the related art has been included in this disclosure solely for the purposes of providing a context for the present disclosure and should not be taken as an admission that any or all of the discussion was known at the time the invention was made.

BRIEF DESCRIPTION OF THE DRAWING FIGURES

Subject matter of the present disclosure is particularly pointed out and distinctly claimed in the concluding portion of the specification. A more complete understanding of the present disclosure, however, may be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Exemplary embodiments of the disclosure are described herein in terms of various functional components and various steps. It should be appreciated that such functional components may be realized by any number of hardware or structural components configured to perform the specified functions. Further, it should be noted that while various components may be suitably coupled or connected to other components within an exemplary system, such connections and couplings can be realized by direct connection between components, or by connection through other components and devices located therebetween.

As set forth in more detail below, various exemplary embodiments of the disclosure provide an electronic communication system and/or components thereof and a method to reduce or manage power consumption of one or more devices. While the ways in which the system and method manage (electronic) device power consumption is described in more detail below, in general, the system and method employ presence or proximity information to transition a device between a wake mode and a sleep or reduced power consuming mode. Basing transition to a sleep mode on the presence or proximity of the user allows for additional power savings potential versus time of day scheduled sleep transition. The presence-based transition can, for example, provide the same power savings as a time of day schedule plus additional savings when the user is not present in his/her office outside of the time of day schedule. Further, as explained below, such transitions can occur automatically (e.g., with a user authorization), without requiring a user to manually logout of a system.

Figure 1:
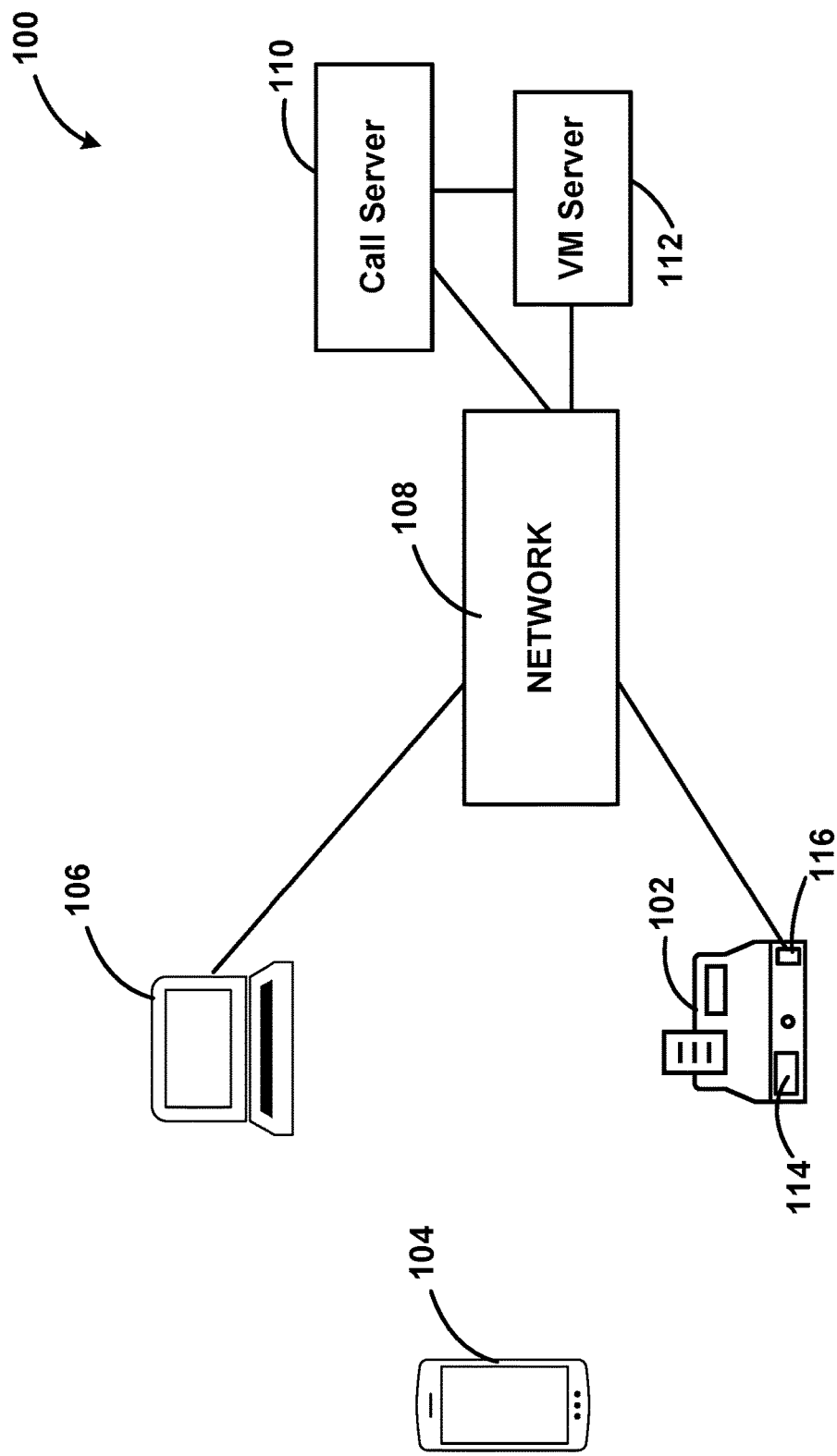
FIG. 1 illustrates an electronic communication system in accordance with exemplary embodiments of the disclosure.

Turning now to the figures, FIG. 1 illustrates an electronic communication system 100 in accordance with examples of this disclosure. As set forth in more detail below, electronic communication system 100 can be used to conserve energy use of one or more electronic devices by causing the one or more electronic devices to automatically enter a sleep mode or a wake mode based on a proximity of a (e.g., previously-paired) mobile device.

In the illustrated example, electronic communication system 100 includes an electronic device (sometimes simply referred to simply as device) 102 and/or 106, a mobile device 104, a network 108, and call server 110. System 100 can also include a voicemail server 112. Although illustrated with particular devices and components 102-112, electronic communication systems in accordance with other embodiments can suitably include other electronic devices and configurations. Unless otherwise noted, network 108, call server 110, and voicemail server 112 may not be required to practice examples of the disclosure.

Device 102 can be or include an internet protocol (IP) phone and/or other power over ethernet device, such as a camera, wireless access point, wireless extender, or the like. In accordance with examples of the disclosure, device 102 includes a proximity connection module 114 and a network connector 116.

As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

Proximity connection module 114 is configured to establish a proximity connection using user credentials between device 102 and a mobile device, such as mobile device 104, and to monitor the proximity connection. Proximity connection module 114 can be further configured to automatically transition electronic device 102 from a wake mode to a sleep mode when one or more of the mobile device is beyond a predetermined distance from the electronic device or the proximity connection disconnected and likewise automatically transition electronic device 102 from a sleep mode to a wake mode when one or more of the mobile device is within a predetermined distance from the electronic device or the proximity connection is reestablished. Proximity connection module 114 or device 102 can be further configured to, upon detecting by device 102 one or more of mobile device 104 is beyond the predetermined distance or the proximity connection disconnected, providing a user interphase prompt on one or more of device 102 and mobile device 104 to query a user whether to allow device 102 to enter the sleep mode. In accordance with various examples of the illustrated device 102, one or more device features (e.g., a plurality of device features) are deprecated during the sleep mode and user credentials (e.g., that were used during an initial pairing of devices 102, 104) are retained by the device 102 during the sleep mode. Although described in connection with one device 102 entering a sleep or awake mode, system 100 can be configured, such that proximity or lack of proximity to one or more devices 102, 106 can trigger a sleep mode or wake mode of a plurality of devices, such as devices 102 and 106—e.g., all devices within a workspace.

By way of examples, proximity connection module 114 can include a Bluetooth, WiFi, sound-based (e.g., breathing) presence detection, or other suitable proximity detection and/or connection module. A proximity connection can be or include any of these modules and/or associated protocols. By way of particular example, proximity connection module 114 includes a Bluetooth module and the connection is a Bluetooth connection.

Network connector 116 can be or include any suitable network connector. By way of example, network connector 116 is or includes an ethernet connector, such as a power over ethernet connector.

Mobile device 104 can be or include any suitable mobile device. For example, device 104 can be or include a wearable device, a tablet computer, a mobile phone, a personal (e.g., laptop or desktop) computer, a headset, or the like. Mobile device 104 can include an application or client to perform various functions set forth herein and/or to cause to be displayed a graphical user interface as described herein.

Device 106 may suitably include another wired or wireless device. Device 106 can be or include any suitable device with wired or wireless communication features that can connect to network 108. For example, device 106 can include a wearable device, a tablet computer, a wired phone, a mobile phone, a personal (e.g., laptop or desktop) computer, a streaming device, such as a game console or other media streaming device, or the like. Device 106 may be optional. In some cases, device 106 can include a proximity connection module (e.g., same or similar to proximity connection module 114) and/or a network connector (e.g., same or similar to network connector 116).

Network 108 can be, for example, an internet protocol (IP) network. Exemplary types of networks suitable for network 108 include a local area network, a wide-area network, a metropolitan area network, and wireless networks. Various components of network 108 can be coupled to one or more other components using an Ethernet connection, other wired connections, and/or wireless interfaces. As illustrated, network 108 can be coupled to other networks and/or to other devices typically coupled to networks. By way of particular example, network 108 includes a private branch exchange (PBX). Network 108 can be coupled to the Internet via a web portal and/or a public switched telephone network (PSTN) via a suitable gateway/SBC.

Call server 110 can be coupled to network 108. Alternatively, call server 110 can form part of network 108. In accordance with examples of the disclosure, call server 110 can be or include a Private Branch Exchange (PBX) server, an internet protocol (IP) call server, or another type of server configured to receive and route telephonic information. Call server 110 can be embodied in a single apparatus or may be distributed across a number of different apparatuses. Although not separately shown in the figures, call server 110 can include at least one processor and at least one electronic memory operatively coupled to the at least one processor for controlling operation of the call server. Call server 110 also includes a number of other components that allow call server 110 to communicate with external apparatus and to control call server 110 internal functions.

Voicemail server 112 can be a standalone device, part of network 108 and/or call server 110 and/or part of any of devices 102-106. Voicemail server 112 can be a dedicated voicemail server or be part of a distributed system. Voicemail server 112 can include a processor and at least one electronic memory operatively coupled to the at least one processor for controlling operation of voicemail server 112.

Figure 2:
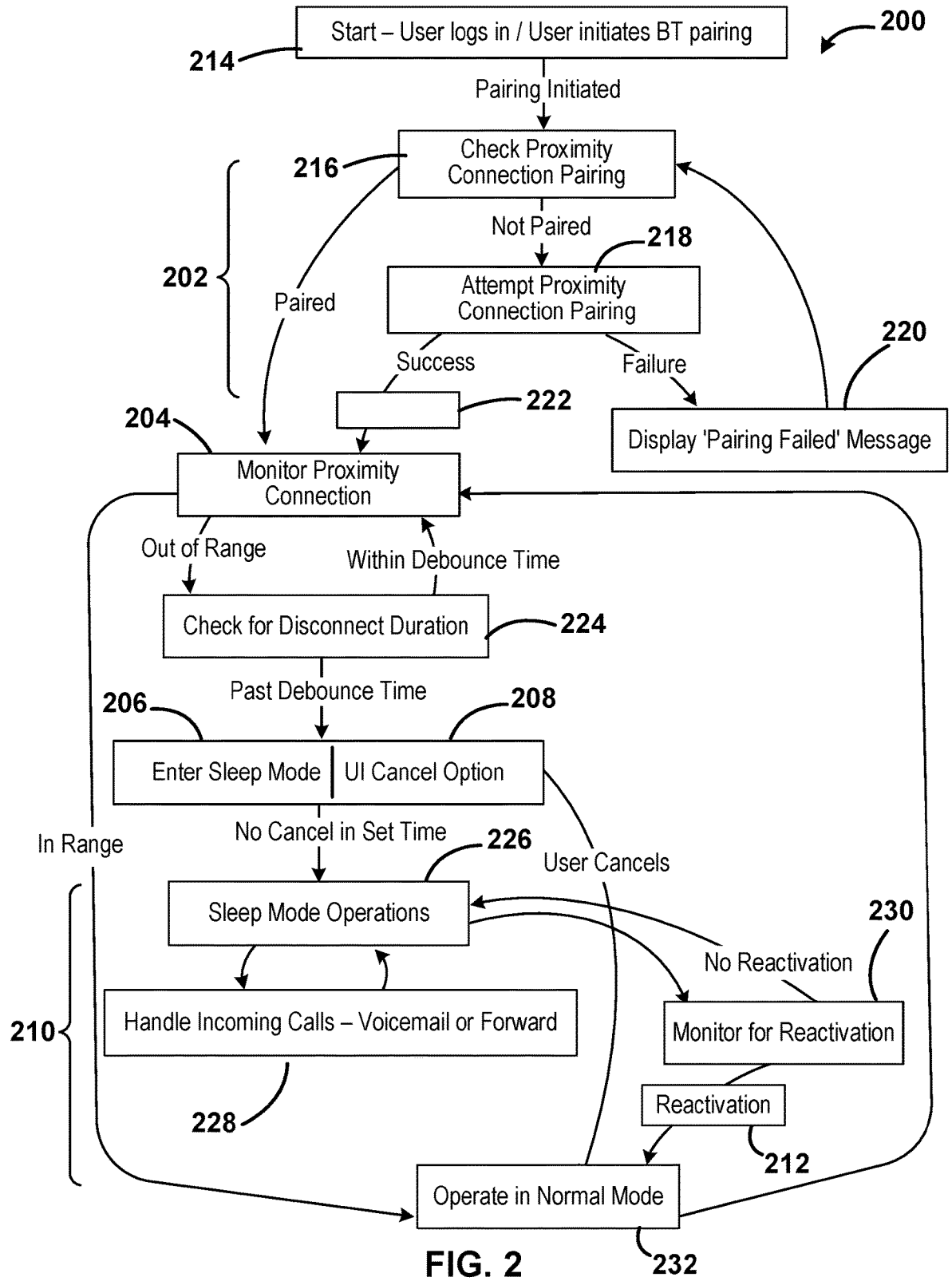
FIG. 2 illustrates a method of managing power consumption of a device in accordance with exemplary embodiments of the disclosure.

FIG. 2 illustrates a method 200 of managing power consumption of a device in accordance with further embodiments of the disclosure. Method 200 includes the steps of establishing a proximity connection (202), monitoring the proximity connection (204), automatically transitioning the device from a wake mode to a sleep mode (206), and providing a user interphase prompt on one or more of the device and the mobile device to query a user whether to allow the device to enter the sleep mode (208). Method 200 can also include performing sleep mode operations (210) and/or automatically reestablishing the proximity connection using the user credentials (212).

In the illustrated example, method 200 begins with an initial user login step 214. Step 214 can be used to establish user credentials that can be used during establishing a proximity connection step 202. During step 216, a user interface (e.g., on device 102, 104, or 106) can be used to enter user credentials. The user credentials can be stored, for example, on any of devices 102-106, or any of servers 108-112.

During step 202, a proximity pairing connection is checked (e.g., by one or more of devices 102 and 104). If a device is determined to be proximate a device (e.g., device 102), method 200 proceeds to step 218 of attempting to pair a proximity connection between the device (e.g., device 102) and a mobile device (e.g., device 104). The proximity connection can be any suitable proximity connection, such as the proximity connections described above.

If a proximity connection is not automatically paired, an error message is displayed on one or more of the device and the mobile device (step 220). In this case, method 200 can return to step 216.

If a proximity connection is successful, method 200 (e.g., automatically) establishes a proximity connection using user credentials between the device and the mobile device (step 222). Method 200 can then proceed to step 204 of monitoring the proximity connection. During this step, the device can periodically check whether the mobile device is beyond a predetermined distance and/or the proximity connection is disconnected between the device and the mobile device (224). By way of example, the device can check for a disconnect/out of range every 1, 0.5, or 0.1 seconds. If a disconnect and/or out of range is detected, a time of the disconnect/out of range is determined and compared to a (e.g., first) threshold period. If the time period is greater than the first threshold period, method 200 can proceed to automatically transitioning the device from a wake mode to a sleep mode when one or more of the mobile device is beyond a predetermined distance or the proximity connection disconnected (206) and/or providing a user interphase prompt on one or more of the device and the mobile device to query a user whether to allow the device to enter the sleep mode (208). The user interface prompt can be part of the transitioning to the sleep mode. If a user uses the user interface to cancel entry of the device into the sleep mode, method 200 continues to step 232 of normal operation. In more detail, method 200 can include determining a time period of one or more of the mobile device is beyond a predetermined distance or the proximity connection disconnected and comparing the time period to a predetermined first threshold period, and if the time period is greater than the first threshold period, proceeding to providing a user interphase prompt on one or more of the device and the mobile device to query a user whether to allow the device to enter the sleep mode, and if the time period is less than the first threshold period, maintaining a wake state of the device. If the user does not cancel entry of the sleep mode—e.g., a user does not respond to a confirmation request within a (e.g., second) threshold period or the user affirmatively accepts a request to enter a sleep mode, method 200 can continue to sleep mode operations (step 226). In other words, method 200 can include comparing the time period to a predetermined second threshold period and automatically entering the sleep mode if the time period exceeds the second threshold period. Alternatively, the device can be maintained in a wake mode unless an authorization to enter the sleep mode is entered by the user on the device or on the mobile device.

During step 226, one or more device features of the device are deprecated. For example, one or more of: network connections of the device can be disabled during the sleep mode, a display lighting can be dimmed or turned off, a processor internal clock speed can be slowed, power to one or more USB ports can be reduced or turned off, and/or one or more network connections can be terminated. Further, the user credentials exchanged during step 214 are retained by the device during the sleep mode.

Further, during step 226, the call server may not generate any error logs for the device while the device is in the sleep mode—e.g., when the device disconnects from the network.

During step 206, the device can send the call server a signal to notify the call server that a user is away from the device. During the time the user is away from the device, the call server can reroute or forward calls (e.g., to the mobile device) (step 228). More particularly, method 200 can include—upon detecting by the device one or more of the mobile device is beyond the predetermined distance or the proximity connection disconnected, sending a signal to the call server, receiving the signal by the call server, and in response to receiving the signal by the call server, routing a call to one or more other devices, such as mobile device 104 or another device associated with the user or within an enterprise. In some cases, in response to receiving the signal by the call server, the call is routed to a voicemail server, such as voicemail server 112.

As illustrated, when the proximity connection disconnected, method 200 can further include monitoring for a reconnection between the device and the mobile device (step 230).

In some cases, step 212 of automatically reactivating or waking or awaking the device(s) can include lifting a handset on the device, pressing a button on the device, using an interface on the mobile device, or upon detected proximity.

In some cases, upon detecting a proximate presence of the mobile device, method 200 can present a user interface prompt to one or more of the mobile device and the device to determine whether a user would like to reestablish the proximity connection. In some cases, method 200 can include automatically reestablishing the proximity connection using the user credentials (e.g., a phone extension number, a username, and a password) and optionally personalized settings, such as where to forward calls when the device is in a sleep mode, or the like. In this case, method 200 can include awakening the device from the sleep mode and operating the device in normal or wake mode (step 232).

At step 232, any calls that were directed to the voicemail server can be displayed on the device and/or on the mobile device using the user interface. For example, a number of missed calls, a number of voicemails, and the like can be displayed. Extensions and/or phone numbers associated with the missed calls and/or voicemails can also be displayed.

Method 200 can further include the device entering a sleep mode at a particular time of day, on certain dates, and/or on certain days of the week. In some cases, method 200 can include device 102 receiving a signal to enter a sleep mode from call server 110 or otherwise via network 108.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

The invention claimed is:

1. A method of managing power consumption of a device, the method comprising:
   establishing a proximity connection using user credentials between the device and a mobile device;
   monitoring the proximity connection;
   automatically transitioning the device from a wake mode to a sleep mode when one or more of the mobile device is beyond a predetermined distance or the proximity connection disconnected;
   upon detecting by the device one or more of the mobile device is beyond the predetermined distance or the proximity connection disconnected,
   providing a user interphase prompt on one or more of the device and the mobile device to query a user whether to allow the device to enter the sleep mode,
   sending a signal to a call server,
   receiving the signal by the call server, and
   in response to receiving the signal by the call server, routing a call to one or more other devices,
   wherein when the device is in the sleep mode, one or more device features are deprecated, and
   wherein the user credentials are retained by the device during the sleep mode.

2. The method of claim 1, wherein the device comprises an internet protocol phone.

3. The method of claim 1, wherein the device comprises a power over ethernet device.

4. The method of claim 1, wherein the proximity connection is a Bluetooth connection.

5. The method of claim 1, wherein the device is further configured to enter the sleep mode based on a time of day and based on information received from a call server.

6. The method of claim 1, wherein when the proximity connection disconnected, the method further comprises automatically reestablishing the proximity connection using the user credentials.

7. The method of claim 6, further comprising awakening the device from the sleep mode.

8. The method of claim 1, wherein when the proximity connection disconnected, the method further comprises detecting a proximate presence of the mobile device and presenting a user interface prompt to one or more of the mobile device and the device to determine whether a user would like to reestablish the proximity connection.

9. The method of claim 1, wherein in response to receiving the signal by the call server, the call is routed to the mobile device.

10. The method of claim 1, wherein in response to receiving the signal by the call server, the call is routed to a voicemail server.

11. The method of claim 1, further comprising:
    determining a time period of one or more of the mobile device is beyond a predetermined distance or the proximity connection disconnected;
    comparing the time period to a predetermined first threshold period, and
    if the time period is greater than the first threshold period, proceeding to providing a user interphase prompt on one or more of the device and the mobile device to query a user whether to allow the device to enter the sleep mode, and
    if the time period is less than the first threshold period, maintaining a wake state of the device.

12. The method of claim 11, further comprising:
    comparing the time period to a predetermined second threshold period and automatically entering the sleep mode if the time period exceeds the second threshold period.

13. The method of claim 1, wherein network connections of the device are disabled during the sleep mode.

14. The method of claim 1, wherein the one or more device features that are deprecated include: a display lighting, a processor internal clock speed, power to one or more USB ports, and one or more network connections.

15. The method of claim 1, further comprising manipulating the device to awaken the device.

16. An electronic communication system comprising:
    an electronic device comprising:
        a proximity connection module;
        a network connector; and
        a call server coupled to the electronic device;
    wherein the proximity connection module:
        establishes a proximity connection using user credentials between the electronic device and a mobile device;
        monitors the proximity connection;
        automatically transitions the electronic device from a wake mode to a sleep mode when one or more of the mobile device is beyond a predetermined distance from the electronic device or the proximity connection disconnected; and
        upon detecting by the device one or more of the mobile device is beyond the predetermined distance or the proximity connection disconnected,
        providing a user interphase prompt on one or more of the electronic device and the mobile device to query a user whether to allow the device to enter the sleep mode,
    sending a signal to a call server,
    receiving the signal by the call server, and
    in response to receiving the signal by the call server, routing a call to one or more other devices,
    wherein when the electronic device is in the sleep mode, one or more device features are deprecated, and
    wherein the user credentials are retained by the electronic device during the sleep mode.

17. The electronic communication system of claim 16, wherein the proximity connection is a Bluetooth connection.

18. A method of managing power consumption of a device, the method comprising:
    establishing a Bluetooth connection between the device and a mobile device;
    monitoring the Bluetooth connection;
    automatically transitioning the device from a wake mode to a sleep mode when one or more of the mobile device is beyond a predetermined distance from the device or the Bluetooth connection disconnected;
    upon detecting by the device one or more of the mobile device is beyond the predetermined distance or the Bluetooth connection disconnected,
    providing a user interphase prompt on one or more of the device and the mobile device to query a user whether to allow the device to enter the sleep mode, sending a signal to a call server,
receiving the signal by the call server, and
in response to receiving the signal by the call server, routing a call to one or more other devices,
wherein when the device is in the sleep mode, a plurality of device features are deprecated, and
wherein user credentials are retained by the device during the sleep mode.

\* \* \* \* \*